July 17, 1951          J. W. MORRIS          2,560,733
FISHING LURE
Filed Sept. 22, 1947
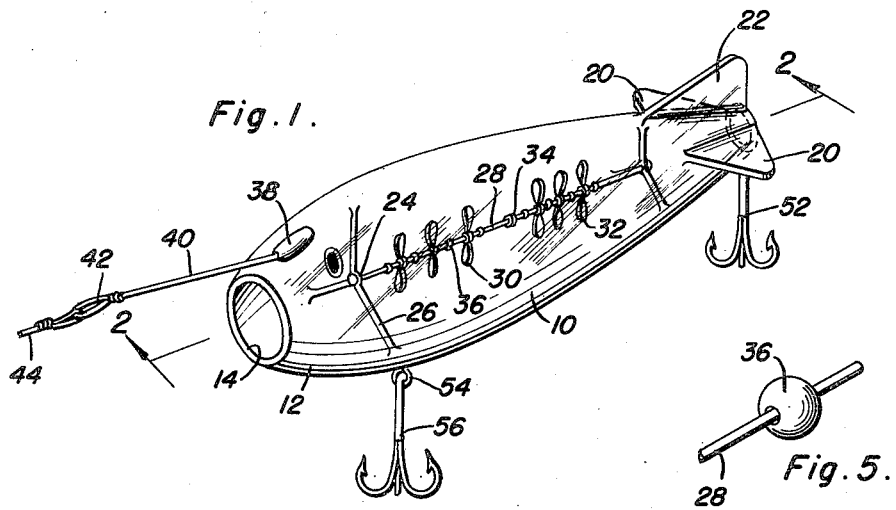
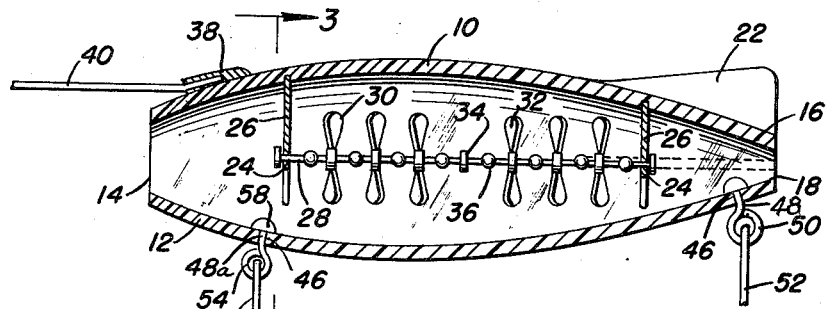
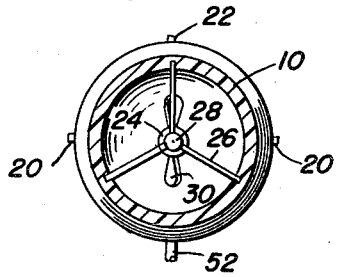
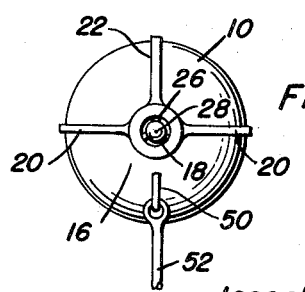
Inventor
Joseph W. Morris
By *Clarence A. O'Brien and Harvey B. Jacobson*
Attorneys Patented July 17, 1951

2,560,733

UNITED STATES PATENT OFFICE 2,560,733

FISHING LURE

Joseph W. Morris, Kermit, Tex.

Application September 22, 1947, Serial No. 775,428

4 Claims. (Cl. 43—42.06)

This invention relates to new and useful improvements in fishing lures and the primary object of the present invention is to provide a hollow open ended fishing lure including novel and improved oppositely rotating spinners that will churn up the water passing through the lure body as the lure is pulled through a fluid medium.

Another object of the present invention is to provide a hollow-type lure whose differentiated size in outlet and inlet will produce a flow of water through the body under pressure obtained from the motion of the lure in being pulled through a source of water, thus causing water passing through and leaving the hollow body to bubble and attract fish and the like thereto.

Another important object of the present invention is to provide an artificial bait including a hollow body open at both ends and so designed as to produce bubbles as the same strikes a body of water and the water replaces the air within the body, thus providing means for attracting fish and the like thereto.

A further object of the present invention is to provide a fishing lure including a plurality of tail fins that are adapted to prevent dipping motion of the body as the same is pulled through a fluid medium thus simulating the actual smooth movement of a fish.

A still further aim of the present invention is to provide a lure of the character referred to that is simple and practical in construction, strong and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention attached to a fishing line, and with parts of the line broken away and shown in section;

Figure 2 is a longitudinal vertical sectional view of the present fishing lure taken substantially on the plane of section line 2—2 of Figure 1;

Figure 3 is a transverse vertical sectional view taken substantially on the plane of section line 3—3 of Figure 2;

Figure 4 is an end view of the present lure; and,

Figure 5 is an enlarged fragmentary view showing one of the spinner spacing members.

Referring now to the drawings in detail, wherein for the purpose of illustration, there is disclosed a preferred embodiment of the present invention, the numeral 10 represents an elongated hollow body, circular in cross section and preferably formed of a translucent plastic material which may be suitably colored. This body terminates at its forward end in a head 12 having an inlet opening 14, and at its opposite end in a tail portion 16 having a reduced outlet opening 18. These openings 14 and 18 oppose each other and are centrally located with respect to the longitudinal axis of the body.

Fixedly secured to the opposite sides of the tail portion 16, is a pair of rigid substantially triangular side fins or plates 20. Also fixedly secured to the tail portion and on its upper periphery, is a vertical fin or tail plate 22. These fins 20 and 22 tend to prevent dipping or vertical tipping motion of the body as the same is pulled through a body of water.

The numeral 24 represents a pair of vertically disposed longitudinally spaced, transverse bearing hubs having a plurality of radially disposed, integral support arms 26 that are rigidly secured to the inner periphery of the body in such a manner as to support the hubs 24 in alignment with the longitudinal axis of the body.

Journalled for rotation in the hubs 24 is a longitudinally disposed shaft 28 that supports a group of forward propellers or spinners 30 that are adapted to rotate in one direction and a group of rear propellers or spinners 32 that counteract the forward spinners 30 and which rotate in an opposite direction. The forward and rear groups of spinners are separated by a rigid spacer 34 and the spinners are individually spaced by rotatable spherical members 36.

Secured to the upper periphery of the head 12, is a socket member 38 that is closed at its rear end. This member 38 fixedly engages one end of a forwardly extending flexible connector 40 the outer terminal of which forms a loop 42 that engages a fishing line 44.

Apertures 46 are provided in the lower periphery of the head 12 and tail 16 and rotatably receive the shank portions 48 and 48a respectively of a rear eye member 50 supporting a rear gang of hooks 52 and a forward eye member 54 supporting a forward gang of hooks 56. The inner ends of the shanks 48 and 48a are flattened as at 58 to prevent disengagement of the eye members with the body.

In practical use of the device, as the fishing line is cast into a body of water, water will enter the inlet 14 thus replacing the air in the body and forcing the same outwardly through the outlet opening 18. This occurrence will cause bubbles to be emitted from the body to attract fish thereto.

When the body is drawn through a body of water, the forward propellers will rotate in one direction and the rear propellers will rotate in an opposite direction so that the propellers will counteract each other to prevent torsion in the shaft.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A fish lure comprising an elongated hollow body having an inlet at one end and a reduced outlet at the opposite end, means carried by said body and disposed exteriorly of the body for preventing dipping motion of said body when pulled through a fluid medium, and means carried by and disposed interiorly of said body to be actuated by liquid passing through the body for agitating water passing through the body, said last mentioned means including a longitudinal shaft carried within said body, a plurality of forward spinners carried by said shaft and a second plurality of rear spinners rotatably mounted on said shaft for counteracting said first spinners.

2. A fish lure comprising an elongated hollow body having an inlet at one end and a reduced outlet at the opposite end, means carried by said body and disposed exteriorly of the body for preventing dipping motion of said body when pulled through a fluid medium, and means carried by and disposed interiorly of said body to be actuated by liquid passing through the body for agitating water passing through the body, said last mentioned means including a plurality of longitudinally spaced bearings, means connecting said bearings to the inner periphery of said body, a plurality of forward propellers rotatably mounted on said shaft, a further plurality of rear propellers rotatably mounted on said shaft for counteracting said first propellers and means spacing each of said propellers relative to each other.

3. A fish lure comprising an elongated hollow body, said body having an unrestricted central inlet opening at one end and an unrestricted central outlet opening at its other end, said inlet opening being in registry with the outlet opening and also being considerably larger than the outlet opening, said body including a tapered rear end portion in which the outlet opening is provided, and a shaft disposed within the body and coaxial with the body, support means in the body for the shaft, a forward group of propellers on the shaft adapted to rotate in one direction and a rear group of propellers on the shaft adapted to rotate in a direction opposite from the direction of rotation of the forward group of propellers.

4. A fish lure comprising an elongated hollow body having an inlet at one end and a reduced outlet at its opposite end, means carried by said body and disposed exteriorly of the body opposing rotation of the body as the body is pulled through a fluid medium, a shaft supported within the body, and a pair of oppositely rotating spinners mounted on the shaft and actuated in response to liquid passing through the body to rotate in opposite directions to prevent torque in the shaft.

JOSEPH W. MORRIS.

REFERENCES CITED

The following references are of record in the file of this patent:

UNITED STATES PATENTS

| Number | Name | Date |
|---|---|---|
| D. 149,238 | Vaars | Apr. 6, 1948 |
| 418,200 | Loftie | Dec. 31, 1889 |
| 723,045 | Shaffer | Mar. 17, 1903 |
| 889,804 | Pflueger | June 2, 1908 |
| 966,068 | Williamson | Aug. 2, 1910 |
| 1,200,135 | Reynolds | Oct. 3, 1916 |
| 1,390,601 | Caldwell | Sept. 13, 1921 |
| 1,812,235 | Carr | June 30, 1931 |
| 1,842,127 | Stickel et al. | Jan. 19, 1932 |
| 2,155,294 | Barnett | Apr. 18, 1939 |
| 2,176,803 | Rosselle | Oct. 17, 1939 |
| 2,472,639 | Wickens | June 7, 1949 |

FOREIGN PATENTS

| Number | Country | Date |
|---|---|---|
| 39,440 | Sweden | Sept. 1915 |
| 748,370 | France | 1933 |